US006793821B2

(12) United States Patent
Lee et al.

(10) Patent No.: US 6,793,821 B2
(45) Date of Patent: Sep. 21, 2004

(54) SUPER WATER-REPELLENT ORGANIC/INORGANIC COMPOSITE MEMBRANE

(75) Inventors: Soo-Bok Lee, Daejeon (KR); In-Joon Park, Daejeon (KR); Kwang-Won Lee, Daejeon (KR); Dong-Kwon Kim, Daejeon (KR); Jeong-Hun Kim, Daejeon (KR); Jong-Wook Ha, Seoul (KR); Hyung-Sang Park, Seoul (KR); Dae-Hwan Jung, Daejeon (KR); Juergen Ruehe, Freiburg (DE)

(73) Assignee: Korea Research Institute of Chemical Technology (KR)

( * ) Notice: Subject to any disclaimer, the term of this patent is extended or adjusted under 35 U.S.C. 154(b) by 191 days.

(21) Appl. No.: 10/141,280

(22) Filed: May 7, 2002

(65) Prior Publication Data

US 2003/0080049 A1 May 1, 2003

(51) Int. Cl.$^7$ ............................................... B01D 71/26
(52) U.S. Cl. ............. 210/500.36; 210/490; 210/500.27; 210/500.25; 264/45.1; 264/48; 94/14; 55/523
(58) Field of Search ........................ 210/500.27, 500.36, 210/490, 500.25; 264/45.1, 48; 96/14; 95/45; 427/244

(56) References Cited

U.S. PATENT DOCUMENTS 5,663,200 A * 9/1997 Bold et al. .................. 514/487
5,786,291 A * 7/1998 Speca et al. ................ 502/104
5,935,845 A * 8/1999 Koontz ..................... 435/283.1

FOREIGN PATENT DOCUMENTS

JP          04359031 A  *  1/1992
JP          08224536 A  *  2/1996

OTHER PUBLICATIONS

Dae–Hwan Jung, Soo–Bok Lee, In–Joon Park, Dong–Kwon Kim, Hyung–Sang Park, *The Preparation and Characteristics of Ultra–Hydrophobic Surfaces by "Grafting–From" Polymerization*, Abstract presented at the 23$^{rd}$ KSIEC Meeting, held on May 11–12, 2001 by the Korean Society of Industrial and Engineering Chemistry, at Samchok National University, Samchok, Korea, p. 213.

* cited by examiner

Primary Examiner—Ana Fortuna
(74) Attorney, Agent, or Firm—Jones Day

(57) ABSTRACT

The present invention relates to a super water-repellent organic/inorganic composite material, more particularly to a new-concept super water-repellent organic/inorganic composite material with superior separation property having skin layer chemically immobilized with functional polymer on the porous inorganic support surface with fractal surface structure and pores of nanometers to micrometers, using grafting-from surface polymerization method.

7 Claims, 7 Drawing Sheets

With PAF Skin Layer

With No Skin Layer

SUPER WATER-REPELLENT ORGANIC/INORGANIC COMPOSITE MEMBRANE

FIELD OF THE INVENTION

The present invention relates to a super water-repellent organic/inorganic composite membrane, and more particularly to a new-concept super water-repellent organic/inorganic composite membrane having excellent permeability by forming skin layer chemically immobilized with functional polymer on the surface of a porous inorganic support with fractal surface structure and pore size of nanometers to micrometers, using 'grafting-from' polymerization.

BACKGROUND OF THE INVENTION

'Membrane separation' means separating pure molecules from a mixture using physical and chemical properties of membrane. A membrane is a third phase that separates two homogenous phases, whose physical and chemical properties determine the rate of exchanging material and energy through it. FIG. 1 illustrates a schematic diagram of membrane separation. In membrane separation process, all resistance to transfer is focused at skin layer of membrane, and the resistance varies with characteristics of material. Therefore, the rate of transfer through membrane is different from material to material, and it enables separation of materials. The most important factors that affect separation of mixtures through the membrane are pore size of the membrane and chemical properties of the membrane surface. Namely, the pore size and the skin layer with suitable surface characteristics of the membrane should be determined depending on the physical and chemical property of the materials to be separated in the membrane process.

A membrane is classified as polymer membrane and inorganic membrane. The polymer membrane has good separation efficiency because it can endow various properties on the membrane surface. However, it has limitation in operation since polymer material has poor thermal and mechanical stability. On the other hand, the inorganic membrane has advantages in regulating pore size and in high temperature and pressure operation compared to the polymer membrane. However, it is difficult to improve separation efficiency by varying surface functionalities.

In order to solve these problems, organic/inorganic composite membranes with functional polymer film on inorganic support surface have been proposed and actively researched. The organic/inorganic composite membrane can preserve severe operation conditions (the merit of the inorganic membrane), and can have various functionality surfaces (the merit of the polymer membrane). Therefore, it is in the spotlight of researches.

One of the conventional methods of preparing organic/inorganic composite membrane is forming functional surface film on inorganic surface by adsorbing functional polymer solution on inorganic support (This method is called solvent dipping method). With this method, the organic/inorganic composite membrane can be obtained very easily. However, because the polymer surface film of prepared organic/inorganic composite membrane is bonded to the inorganic surface by dispersion force (van der Waals force) only, the durability is poor, and the skin layer can be easily lost resulting the limitation in operation with various environments. The problem of the membrane prepared by the solvent dipping method can be solved by the well known self-assembly method. That is, organic/inorganic composite membrane with chemically bonded functional polymer film can be prepared by grafting-to polymerization, which reacts polymer with reactive functional group on inorganic surface. However, in forming the polymer surface film by grafting-to polymerization, polymer brushes formed by the preceding reaction hinder access of additional reactive polymer to the inorganic surface due to steric hindrance. Accordingly, the more functional polymer film is immobilized on the solid surface, the larger the surface concentration gradient is built-up, and a film with limited thickness (~20 nm) is formed. Therefore, this method is limited in control of thickness of the surface functional film.

Solid surface with super water-repellent property is widely used in everyday lives and industry. Traditionally, the super water-repellent surface has been prepared by forming fluorinated film on solid surface through physicochemical adsorption methods. However, because fluorinated materials have very low surface free energy, it was very difficult to physicochemically prepare the fluorinated film on solid surface. Also, in order to obtain surface with very superior super water-repellency, geometric structure modification of the solid surface is required, as well as chemical surface modification.

SUMMARY OF THE INVENTION

The inventors have developed a functional fluorinated polymer film chemically bonded to inorganic support surface via in-situ surface polymerization using porous inorganic support surface with fractal structure, and self-assembled monolayer of initiator and fluorinated monomer, in order to prepare organic/inorganic composite membrane with easily controllable pore size and surface functionalities which preserve super water-repellency.

Accordingly, an object of this invention is to provide a membrane with superior separation efficiency and operation condition compared to the conventional organic/inorganic composite membrane, with easily controllable pore size and surface functionality and very durable superior water-repellency.

DETAILED DESCRIPTION OF THE INVENTION

The present invention is a super water-repellent organic/inorganic composite membrane with fluorinated polymers or copolymers skin layer formed on porous inorganic support surface and its manufacturing process which produced by using azo chlorosilane as an initiator chemically bonded to the inorganic support surface, and subsequent radical chain polymerization of fluorinated monomers or co-monomers resulting polymer brushes.

Hereunder is given a more detailed description of the present invention. The present invention relates to an organic/inorganic composite membrane with surface properties of super water-repellency and easily controllable membrane pore size, prepared by immobilization of azo chlorosilane initiator and radical-chain reaction of fluorinated monomers or co-monomers on porous inorganic support with fractal surface structure.

The surface structure of organic/inorganic composite membrane according to the present invention comprises the following three components: ① porous inorganic support, ② self-assembled initiator immobilized on the inorganic support and ③ water-repellent polymer brushes polymerized at the radical site of the initiator.

Figure 1:
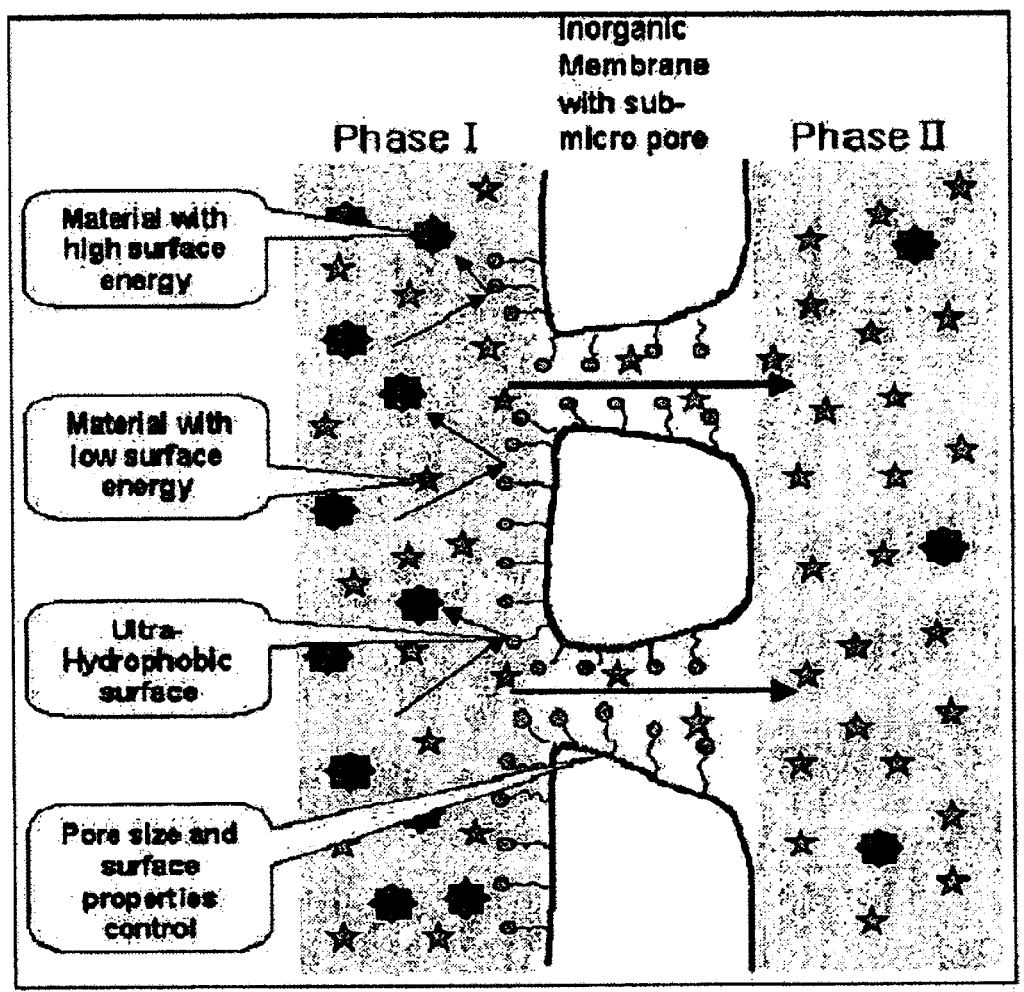
FIG. 1 is a general schematic diagram of membrane separation.
Figure 2A:
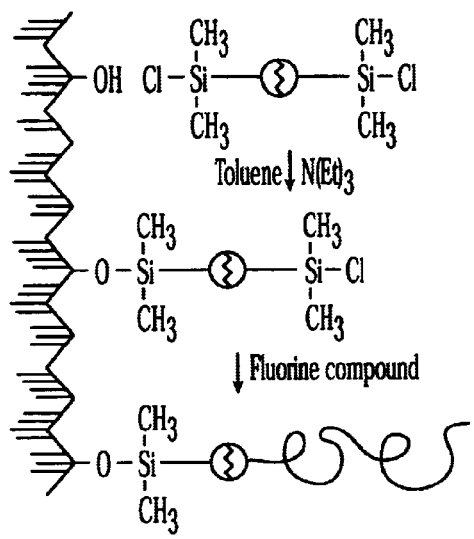
FIG. 2 is skin layer-forming process on porous support by grafting-from polymerization. (a) schematic diagram of grafting-from polymerization process; and (b) XPS analysis result of each step of the grafting-from polymerization.
Figure 2B:
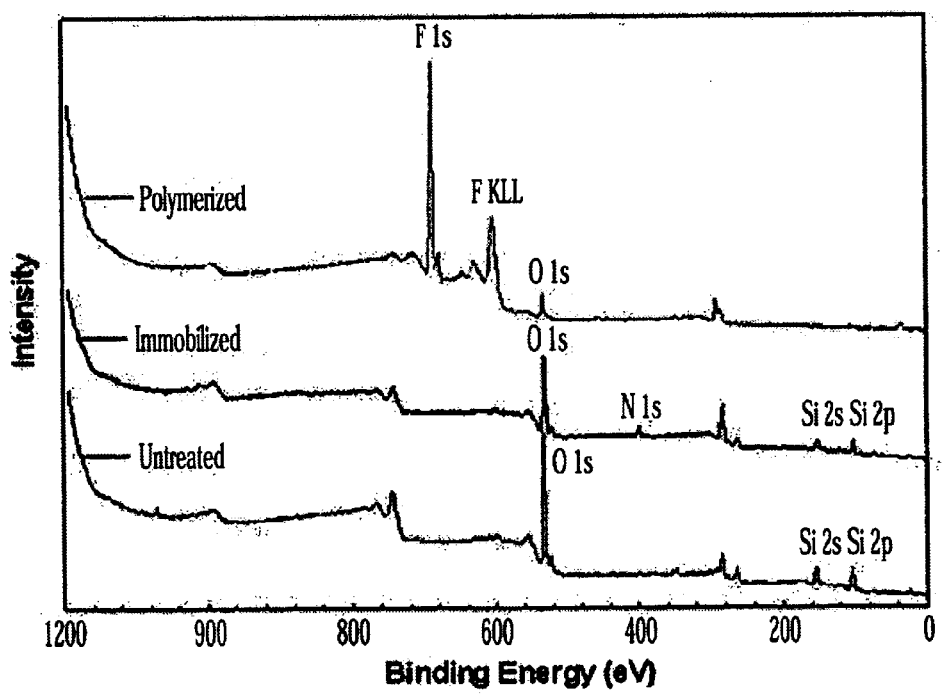

FIG. 2 shows grafting-from polymerization process of surface polymerization in the present invention. As shown in FIG. 2(a), in the grafting-from polymerization, initiator is chemically bonded to surface and then monomers or co-monomers are radically polymerized on the surface. FIG. 2(b) is XPS analysis result of each step of the grafting-from polymerization. XPS analysis of untreated support surface identified presence of hydroxyl group (—OH), which is confirmed by Si peaks at 153.6 eV (Si 2s) and 102.10 eV (Si 2p), and O peak at 531.40 eV (O 1s). XPS analysis after immobilizing the initiator identified presence of azo group of the initiator, which is confirmed by N peak at 399.30 eV (N 1s). XPS analysis after polymerization of fluorinated monomer identified surface coverage of fluorinated films, which is confirmed by existence of fluorine (F) peak at 687.8 eV (F 1s).

In the grafting-from polymerization, the grafting density can be increased than grafting-to polymerization because initiator with small molecular weight is first bonded on solid surface. Accordingly, polymer with various functional groups and easily controllable organic skin layer thickness can be prepared from the grafting-from polymerization. In addition, skin layer obtained from copolymerization of fluorinated monomer has durable super water-repellency and improved material separation efficiency by surface energy difference.

As used herein, the 'self-assembled initiator' means an initiator that is strongly chemical-bonded to inorganic support surface and enables chemical bonding of functional monomer to prepared polymer brushes at radical site of the initiator. Consequently, one end of the initiator is strongly immobilized by chemical bond to the inorganic support surface, and the other end (azo group) is chemically bonded to functional polymer brushes. In the present invention, azo chlorosilane was used as the self-assembled initiator. As a result, concentration control of functional group of the organic/inorganic composite membrane has become facile. That is, the density per unit area of polymer brushes can be controlled by immobilization the various amount of initiator, in order to regulate functionality of composite membrane.

For porous inorganic support that can be used in preparation of super water-repellent organic/inorganic composite membrane of the present invention, the one with fractal structure and pore size of nanometers to micrometers, and more specifically 5 nm–200 μm, can be used. As used herein, 'fractal' means a geometric pattern that is repeated at ever-smaller scales. Surface with fractal structure has super-wettable or super-repellent property. For inorganic support of the present invention, any inorganic material having hydroxyl group (—OH) on surface naturally or artificially can be used. Specific examples of such material are: silica, alumina, titanium oxide, iron oxide, zinc oxide, copper oxide, nickel oxide or cobalt oxide; composite materials comprising two or more of them; and organic/inorganic composite materials including them.

For fluorine monomer used in preparing super water-repellent organic/inorganic composite membrane of the present invention, common monomer used for water repellency can be used. Specifically, monomers expressed by the following Formulas 1–6 and their mixtures can be used,

$$CF_2=CF_2 \tag{1}$$
$$CH_2=CF_2 \tag{2}$$
$$XC_nF_{2n}CH_2OCOCR^1=CH_2 \tag{3}$$
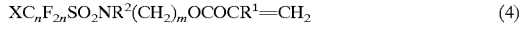
$$XC_nF_{2n}SO_2NR^2(CH_2)_mOCOCR^1=CH_2 \tag{4}$$
$$XC_nF_{2n}CH_2CH(OH)(CH_2)_mOCOCR^1=CH_2 \tag{5}$$
$$XC_nF_{2n}(CH_2)_mOCOCR^1=CH_2 \tag{6}$$

wherein $R^1$ is H or methyl; $R^2$ is methyl, ethyl or propyl; X is H, F or Cl; m is an integer of 2–6; and n is an integer of 3–21.

In addition, co-monomer can be used together with the fluorine monomer in preparing skin layer of the present invention. Specific examples of such co-monomers are: vinyl monomers like ethylene, vinyl chloride monomer (VCM), vinylidene chloride (VDC), (meth)acrylic acid (AA, MAA), methyl (meth)acrylate (MA, MMA), ethyl (meth)acrylate (EA, EMA), butyl (meth)acrylate (BA, BMA), hexyl (meth)acrylate (HA, HMA), dodecyl (meth)acrylate (DA, DMA), stearyl (meth)acrylate (SA, SMA), benzyl (meth)acrylate (BA, BMA), cyclohexyl (meth)acrylate (CHA, CHMA), acrylonitrile (AN), acrylamide (AAM), vinyl acetate (VA) and styrene (St); acryl monomers including crosslinkable group like N-methylol (meth)acrylamide (MAAM, MMAAM), N-methylol acrylamide butyl ether (MAAMBE), N-butyoxy (meth)acrylamide (BAAM, BMAAM), 2-hydroxy (meth)acrylate (HEA, HEMA) and 2-hydroxypropyl (meth)acrylate (HPA, (HPMA); and mixture thereof.

As explained above, organic/inorganic composite membrane of the present invention has very low surface free energy to be about 0.1 dyn/cm. Accordingly, the contact angle is very high as larger than 150° and it is super-hydrophobic. Using this property, liquids with different surface tension can be separated with different molecular state due to difference in materal and energy exchange rate. Also, fluorine compound used in the present invention is known to have water-repellency, oil repellency and contamination resistance due to extremely low-surface free energy property. As a result, preparation of organic/inorganic composite membrane with super-hydrophobic surface and superior mechanical strength was possible.

The following examples are intended to be illustrative of t of the presen and should not be construed as limiting the scope of this invention.

EXAMPLE 1

Porous silica support (radius: 2 cm, thickness: 6 mm) with 20 μm of average pore size, 250 g of dry toluene and 2 g of triethyl amine (TEA) were placed in 500 mL glass reactor. After adding 1 g of 4,4-azobis-(4-cyanopentanoic acid-(3-chlorodimethylsilyl)propyl ester dissolved in 10 mL of dry toluene as azo chlorosilane initiator to the reactor, the reactor was sealed in the inert state. After removing gas inside the porous silica support, initiator immobilization reaction was performed for 1 day at room temperature. When the initiator chemically immobilized to the porous silica support surface by siloxane bond, the porous silica support was taken out of the reactor. And, it was washed with toluene, methanol and acetone in order to remove remaining initiator and formed salts, etc. After drying the washed porous silica support at room temperature, it was put in 500 mL Shrenck glass reactor and 100 g of $C_8F_{17}C_2H_4OCOCH=CH_2$ (hereunder referred to as 'FA') was added as fluorine monomer. Reaction was performed at 50–90° C. in thermostat for 3–8 hours. The prepared membrane was extracted with 1,1,2-trichloro-1,2,2-trifluoroethane (R-113).

Contact angle was measured to identify surface property of the prepared membrane. From contact angle measurement result obtained using water ($H_2O$) and diiodomethane ($CH_2I_2$), apparent surface energy was calculated by the geometric mean approximation. The contact angle was 153.8° for water and 129° for diiodomethane. The calculated surface energy was 0.19 dyn/cm.

$$\gamma_{SL}(1+\cos\theta) = 2\sqrt{\gamma_{SV}^d \cdot \gamma_{LV}^d} + 2\sqrt{\gamma_{SV}^p \cdot \gamma_{LV}^p}$$

$$\gamma_{SV} = \gamma_{SV}^d + \gamma_{SV}^p$$

Figure 3:
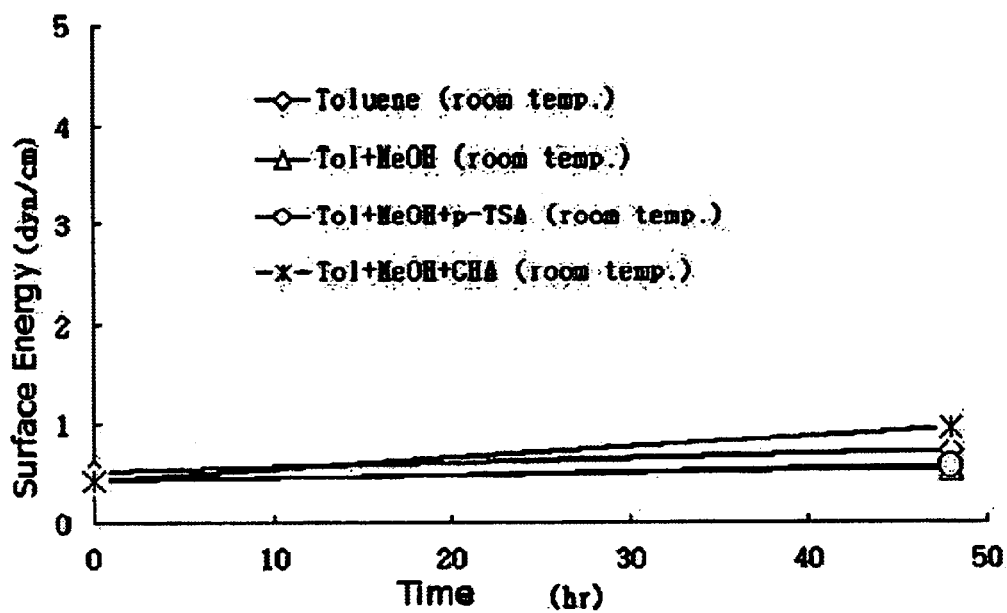
FIG. 3 is a graph that shows durability of water-repellent membrane with PFA skin layer.

Also, the following experiment was performed in order to identify durability of the super water-repellent membrane prepared in Example 1. The membrane sample was dipped in min mixture s toluene, toluene/methanol (90/10) and toluene/methanol/p-toluenesulfonic acid (90/9.5/0.5), and let at room temperature for 48 hours. Surface energy measurement results after 48 hours are shown in FIG. 3. In FIG. 3, it can be shown that the surface energy remained almost the same. Therefore, the membrane of the present invention was identified to have strong durability of water-repellency in dood solvent, acid or base.

Figure 4A:
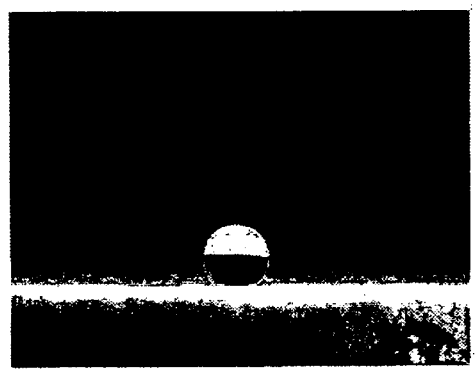
FIG. 4 are (a) photographs that show surface characteristics of membrane with PFA skin layer and (b) porous silica support with no skin layer.
Figure 4B:
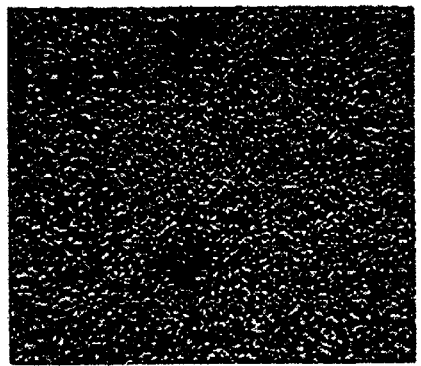

FIG. 4 are photographs that show contact angles for super water-repellent membrane prepared in Example 1(a) and for porous silica support without surface polymerization (b). When the PFA skin layer was formed, the contact angle of water drop on the surface is about 150°–160°, which confirms the super water-repellency.

Figure 5A:
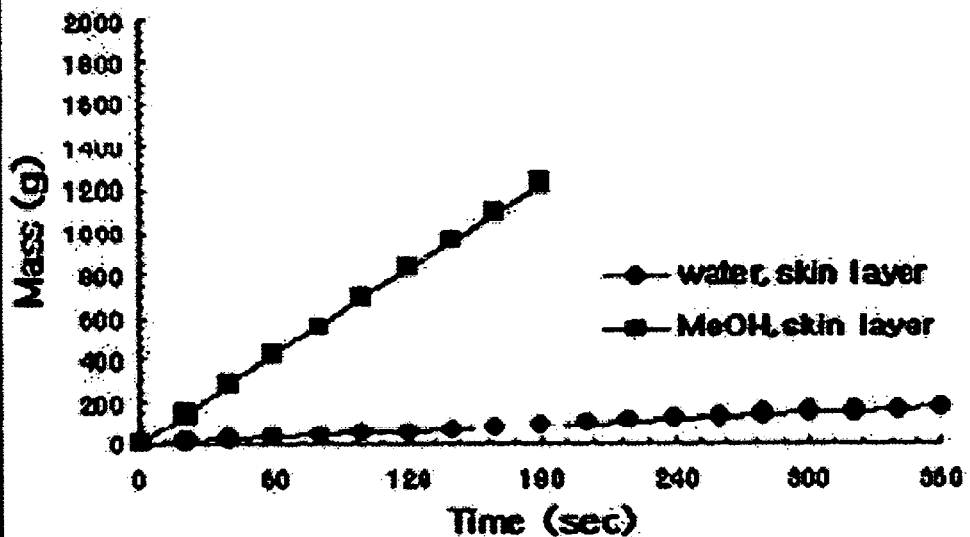
FIG. 5 is (a) water/methanol penetration property of membrane with PFA skin layer and (b) with no skin layer.
Figure 5B:
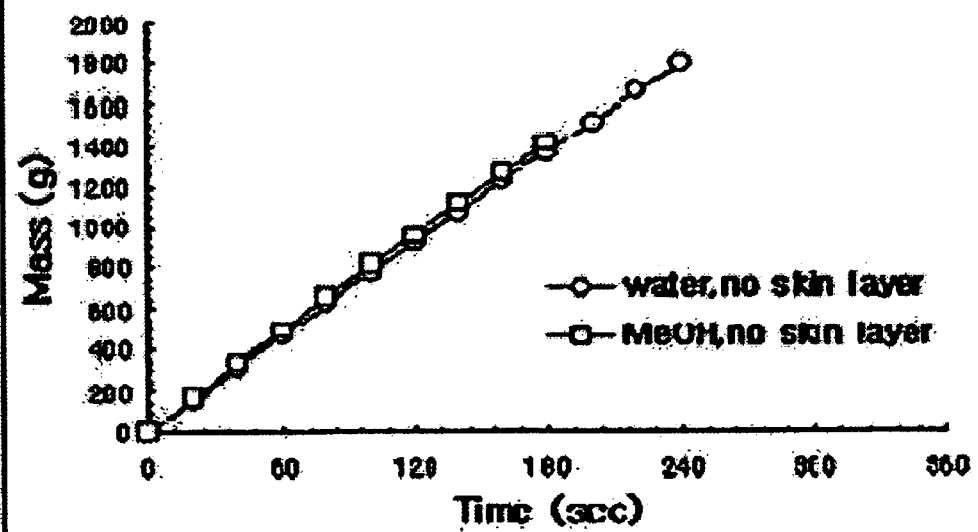
Figure 6A:
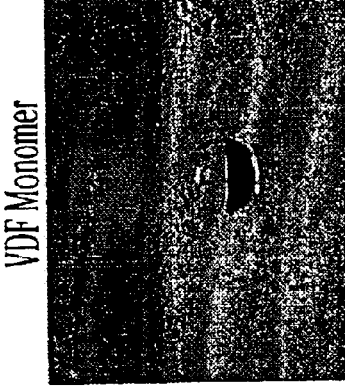
FIG. 6(a)–(e) are photographs that show surface properties of organic/inorganic composite membranes with skin layer formed from various fluorinated monomers and co-monomers.
Figure 6B:
Figure 6C:
Figure 6D:
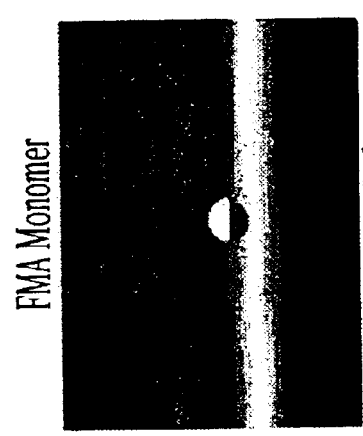
Figure 6E:

Also, penetration property experiment result using water and methanol for identifying penetration property of the prepared composite membrane is shown in FIG. 5. (a) is for membrane with PFA skin layer formed on the porous silica support surface, and (b) is for porous silica support membrane without skin layer. The comparison shows that penetration ratio of water and methanol to membrane with skin layer (a) is low due to super water-repellent surface. Also, penetration ratio of water is lower than that of methanol. It is because water has larger surface tension than methanol.

EXAMPLE 2

Using the same apparatus and method as in Example 1, various membranes with skin layer having various chemical structure were obtained from fluorine monomer or fluorine monomer and co-monomer as in the following Table 1. If the monomer is gas at room temperature, pressurized reactor was cooled with liquid nitrogen and gas was injected into the reactor. Then, the reactor was sealed and surface polymerization reaction was carried out. Support and surface properties of obtained separation membranes are shown in the following Table 1 and appended FIG. 5.

TABLE 1

Contact angle and monomer

| Monomer/Comonomer | Support | Contact Angle (°) | | Surface |
| --- | --- | --- | --- | --- |
| | | $H_2O$ | $CH_2I_2$ | |
| Perfluoroalkyl ethyl methacrylate (FMA) | Silica | 156 | 119.4 | 1.12 |
| Tetrafluoroethylene (TFE) | Alumina | 151 | 112 | 1.08 |
| Vinyledene fluoride (VDF) | Alumina | 146 | 101 | 1.55 |
| FA/MMA = 3/7 (w/w) | Titanium oxide | 146 | 98 | 2.11 |
| FMA/EMA = 3/7 (w/w) | Titanium oxide | 145 | 99 | 1.61 |

FIG. 6(a)–(f) are photographs that show surface properties of organic/inorganic composite membranes with super water-repellent skin layer formed from various fluorine monomers.

Figure 7A:
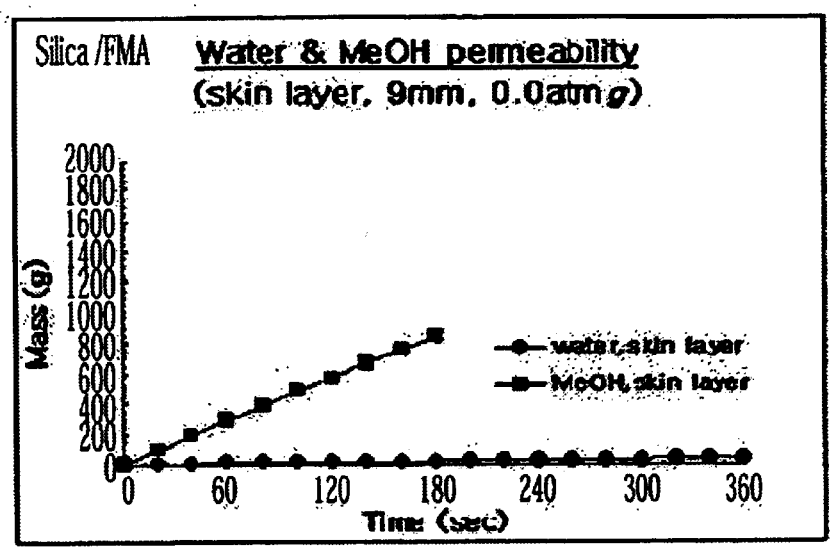
FIG. 7(a)–(c) are graphs that show water/methanol penetration properties of organic/inorganic composite membranes with skin layer formed from various fluorinated monomers on various supports.
Figure 7B:
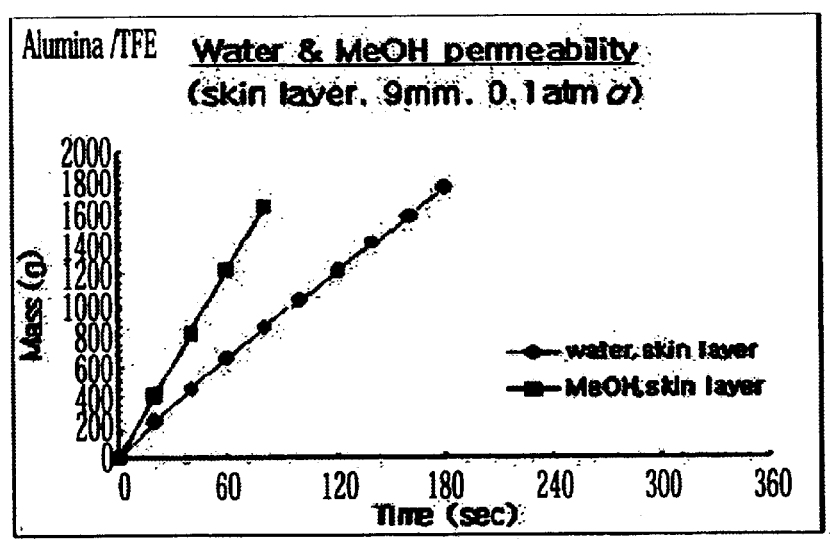
Figure 7C:
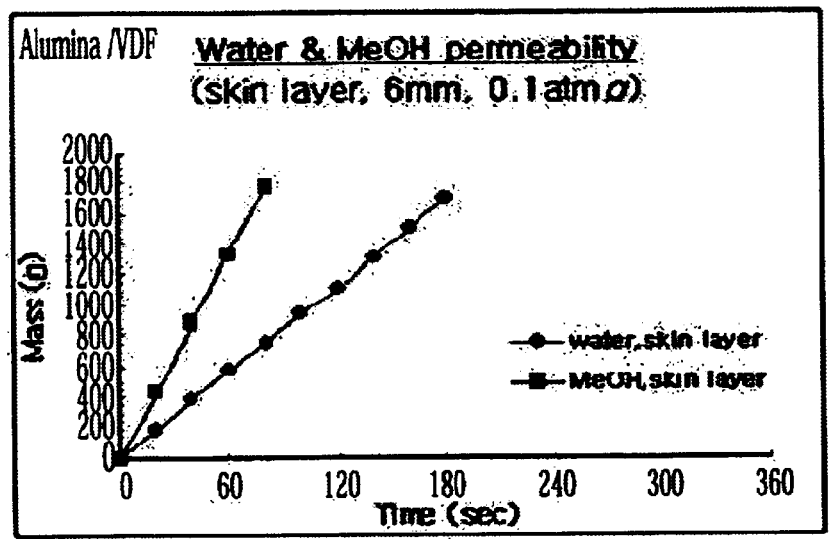

Also, water/methanol penetration property was compared for the prepared organic/inorganic composite membrane having silica support/FMA skin layer, alumina support/TFE skin layer and alumina support/VDF skin layer. The result is shown in FIG. 7.

Comparative Example 1

For porous silica support with no super water-repellent skin layer according to the present invention, both contact angles to water and diiodomethane were 0°. This result shows that apparent surface energy of porous silica, alumina, titanium oxide, etc. are very high.

TABLE 2

Contact angles for various supports

| Support | Contact Angle ($H_2O$) | Contact Angle ($CH_2I_2$) |
| --- | --- | --- |
| Silica | 0° | 0° |
| Alumina | 0° | 0° |
| Titanium oxide | 0° | 0° |

Comparative Example 2

Figure 8A:
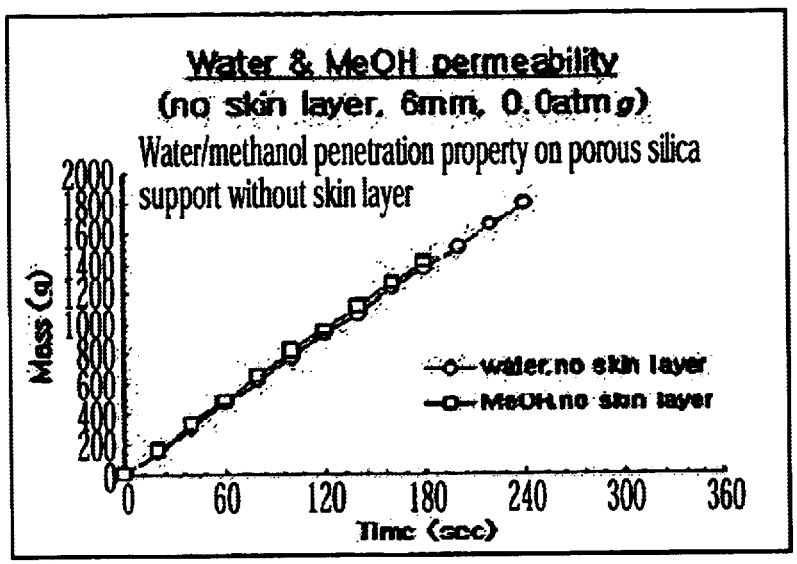
FIG. 8 are graphs that show penetration properties (a) on porous support without skin layer, with and without super water-repellent skin layer (b) to water and (c) methanol.
Figure 8B:
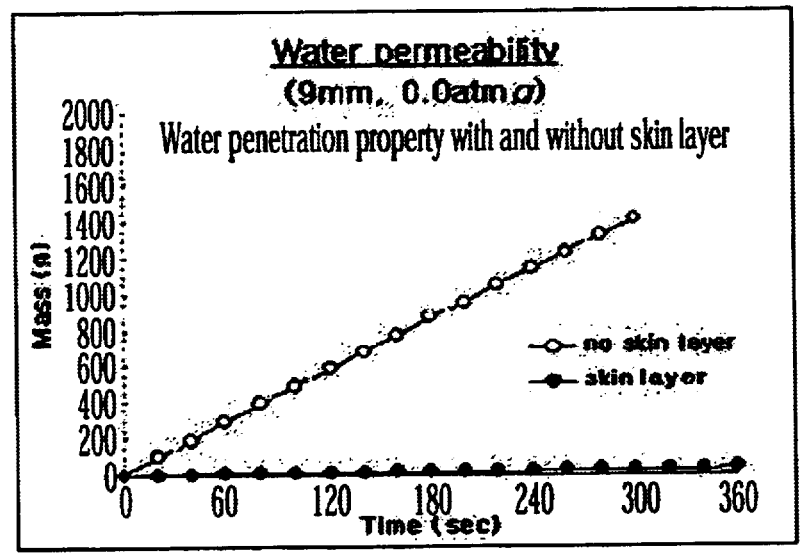
Figure 8C:
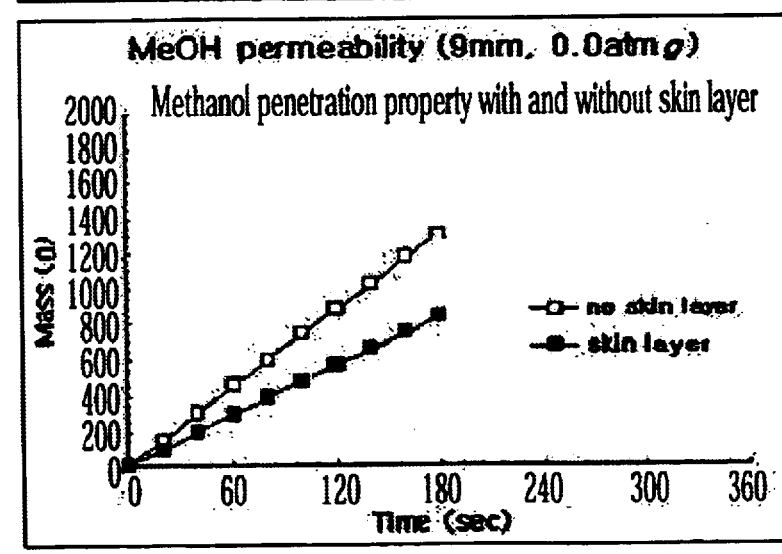

Water/methanol penetration property was compared for porous support with no skin layer and organic/inorganic composite membrane with super water-repellent skin layer. FIG. 8(a) shows water/methanol penetration property for porous silica support (thickness: 6 mm) with no skin layer. Membrane with super water-repellent skin layer obtained from the porous silica support (thickness: 9 mm) with no skin layer and FA fluorine monomer was prepared. FIG. 8(b) and FIG. 8(c) are its water and methanol penetration property at normal pressure, respectively.

In FIG. 8(a), it can be shown that penetration ratio of water and methanol for porous support with no skin layer are almost the same. However, the penetration ratio change of water is much larger than that of methanol for with and without skin layer. This is because water has larger surface energy than methanol.

In general, fractional distillation using boiling point difference of liquids is used in separating liquid mixture in the industry. This method consumes much energy and requires large-scale facilities such as distillation tower. Also, it causes environmental problems and requires large area.

On the contrary, organic/inorganic composite membrane of the present invention can separate liquid mixtures using liquid surface tension difference. Therefore, it is an environment-friendly separation membrane, which neither consumes much energy nor causes any environmental problem. Also, it does not require large area for equipment installation because only pressure for penetrating liquid through the membrane is required.

What is claimed is:

1. A water-repellent membrane with a layer formed from surface polymerization of a fluorine monomer or co-monomer on a porous inorganic support using azo chlorosilane as an initiator, wherein said initiator is chemically bonded to the porous inorganic support and said fluorine monomer or co-monomer has a radical-chain reaction with the initiator to form polymer brushes on the porous inorganic support.

2. The water-repellent membrane according to claim 1, wherein said porous inorganic support has fractal structure of inorganic materials selected from the group consisting of silica, alumina, titanium oxide, iron oxide, zinc oxide, copper oxide, nickel oxide and cobalt oxide.

3. The water-repellent membrane according to claim 1, wherein the fluorine monomer with low surface energy is chemically bonded on the porous inorganic support.

4. The water-repellent membrane according to claim 1, wherein said fluorine monomer has one of formulas 1–6, $$CF_2{=}CF_2 \quad (1)$$

$$CH_2{=}CF_2 \quad (2)$$

$$XC_nF_{2n}CH_2OCOCR^1{=}CH_2 \quad (3)$$

$$XC_nF_{2n}SO_2NR^2(CH_2)_mOCOCR^1{=}CH_2 \quad (4)$$

$$XC_nF_{2n}CH_2CH(OH)(CH_2)_mOCOCR^1{=}CH_2 \quad (5)$$

$$XC_nF_{2n}(CH_2)_mOCOCR^1{=}CH_2 \quad (6)$$

wherein $R^1$ is H or methyl; $R^2$ is methyl, ethyl or propyl; X is H, F or Cl; m is an integer of 2–6; and n is an integer of 3–21.

5. The water-repellent membrane according to claim 1, wherein the co-monomer is selected from the group consisting of vinyl monomers and acryl monomers having crosslinkable group.

6. The water-repellent membrane according to claim 1, wherein said polymerization is grafting-from polymerization of the fluorine monomer or co-monomer on the porous inorganic support.

7. The water-repellent membrane according to claim 1, wherein said membrane has 145°–160° contact angles for water droplet and apparent surface energy of 0.1–2 dyn/cm.

* * * * *